(12) United States Patent
Okubo et al.

(10) Patent No.: US 6,341,953 B1
(45) Date of Patent: Jan. 29, 2002

(54) HYDRAULIC DRIVE SYSTEM OF AN INJECTION MOLDING MACHINE

(75) Inventors: Kazuyuki Okubo; Daiki Tanemura, both of Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 0 days.

(21) Appl. No.: 09/667,852

(22) Filed: Sep. 22, 2000

(30) Foreign Application Priority Data

Sep. 22, 1999 (JP) .......................................... 11-269330

(51) Int. Cl.[7] .............................................. B29C 45/77
(52) U.S. Cl. ...................................... 425/145; 264/40.7
(58) Field of Search ................................ 425/145, 149, 425/150; 264/40.7

(56) References Cited

U.S. PATENT DOCUMENTS 5,714,176 A * 2/1998 Wurl .......................... 425/145

6,257,859 B1 * 7/2001 Koda et al. ................. 425/149

FOREIGN PATENT DOCUMENTS

| JP | A6 323002 | 1/1988 |
|----|-----------|--------|
| JP | A11 105094 | 4/1999 |

* cited by examiner

Primary Examiner—Tim Heitbrink
(74) Attorney, Agent, or Firm—Birch, Stewart, Kolasch &Birch, LLP.

(57) ABSTRACT

Disclosed is a hydraulic drive system of an injection molding machine which has a hydraulic power source equipped with a fixed-displacement hydraulic pump and a servomotor for driving the hydraulic pump and functioning to control discharge rate and discharge pressure of the hydraulic pump through control of the rotational speed of the servomotor. In the hydraulic drive system, a pilot port of a control valve connected to a hydraulic actuator of the injection molding machine is connected to a supply line of working fluid discharged from the hydraulic power source, via a series circuit including a check valve for preventing backflow from the pilot port and a changeover valve.

5 Claims, 2 Drawing Sheets

HYDRAULIC DRIVE SYSTEM OF AN INJECTION MOLDING MACHINE

BACKGROUND OF THE INVENTION

1. Field of the Invention

The present invention relates to a hydraulic drive system of an injection molding machine, equipped with a fixed-displacement hydraulic pump and a servomotor for driving the hydraulic pump.

2. Description of the Related Art

Japanese Patent Application Laid-Open (kokai) No. 63(1988)-23002, for example, discloses a conventional hydraulic drive system which includes a fixed-displacement hydraulic pump and a servomotor for driving the hydraulic pump and in which the discharge rate and discharge pressure of the hydraulic pump are controlled through control of the rotational speed of the servomotor.

In such a hydraulic drive system, the rotational speed of the servomotor is controlled according to load volume. Thus, when such a hydraulic drive system is used in an injection molding machine and pressure control is performed in, for example, a pressure-holding step, the discharge rate of the hydraulic pump decreases due to decrease in load volume, and the rotational speeds of the servomotor and hydraulic pump decrease. The relationship between rotational resistance R and rotational speed V of the hydraulic pump is usually as shown in FIG. 2. Accordingly, in a region where the rotational speed V becomes extremely low; e.g., during the above-mentioned pressure control, the rotational resistance R becomes unstable, as represented by symbol Rs in FIG. 2. As a result, in such an unstable region, the controlled pressure in the pressure-holding step varies, causing impairment in quality of molded articles or in homogeneity of quality among molded articles.

In order to solve the above-mentioned problem, the present applicant has already proposed a hydraulic drive system disclosed in Japanese Patent Application Laid-Open (kokai) No. 11(1999)-105094. The proposed hydraulic drive system employs a relief circuit for releasing working fluid discharged from a hydraulic pump to an oil tank at the time of pressure control, so that the hydraulic pump can always be operated at a rotational speed higher than a certain rotational speed for exiting an unstable region in which the rotational resistance of the hydraulic pump changes unstably. In a control region where the rotational speed V of the hydraulic pump becomes extremely low; i.e., at the time of pressure control which is performed in, for example, a pressure-holding step and in which load volume decreases, working fluid discharged from the hydraulic pump is released to the oil tank through the relief circuit. Accordingly, the rotational speed V of the hydraulic pump is always sufficiently high to render the rotational resistance R stable, thereby avoiding variations in controlled pressure; i.e., enhancing stability in pressure control.

However, the hydraulic drive system disclosed in Japanese Patent Application Laid-Open No. 11(1999)-105094 involves the following problems to be solved.

Notably, some components in a hydraulic circuit which receives working fluid from the hydraulic pump generate an unstable region in operation of the hydraulic drive system. Particularly, a control valve having a pilot port brings the hydraulic drive system into an unstable or uncontrollable state during low-pressure or low-speed control. Specifically, the control valve requires a pilot pressure equal to or greater than a certain level (usually at least 0.4 MPa to 0.5 MPa). When the discharge pressure of the hydraulic pump decreases, there arises a failure to establish a sufficiently high pilot pressure. Thus, during the low-pressure or low-speed control, the control valve returns to its neutral position, thereby bringing the hydraulic drive system into an unstable or uncontrollable state.

The hydraulic drive system disclosed in Japanese Patent Application Laid-Open No. 11(1999)-105094 does not take direct measures to prevent the hydraulic drive system from entering the unstable control region, but takes indirect measures to avoid the unstable control region; i.e., release of working fluid, which is disadvantageous in terms of energy efficiency and control performance and causes complication of the hydraulic circuit with a resultant increase in cost and size.

SUMMARY OF THE INVENTION

An object of the present invention is to solve the problems which bring the control system into an unstable or uncontrollable state; e.g., the problem of a control valve returning to its neutral position, which problems would otherwise occur during low-pressure control in which an unstable region may be generated and to provide a hydraulic drive system of an injection molding machine capable of realizing low-pressure control and low-speed control, which have conventionally been considered to be difficult to perform.

Another object of the present invention is to provide a hydraulic drive system of an injection molding machine capable of reducing cost and size through simplification of a hydraulic circuit and of enhancing energy efficiency and control performance through elimination of release of working fluid.

To achieve the above objects, the present invention provides a hydraulic drive system of an injection molding machine which has a hydraulic power source equipped with a fixed-displacement hydraulic pump and a servomotor for driving the hydraulic pump and functioning to control the discharge rate and discharge pressure of the hydraulic pump through control of the rotational speed of the servomotor. In the hydraulic drive system, a pilot port of a control valve connected to a hydraulic actuator of the injection molding machine is connected to a supply line of working fluid discharged from the hydraulic power source, via a series circuit including a check valve for preventing backflow from the pilot port and a changeover valve.

Thus, even when the discharge pressure of the hydraulic power source drops below a required pilot pressure, the check valve functions to maintain a pilot pressure applied to the pilot port unchanged from a level which has been established before the discharge pressure drops, thereby preventing changeover of the control valve to a neutral position, or generation of an unstable control region, at the time of low-pressure or low-speed control.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the configuration of a hydraulic drive system 1 according to the present embodiment will be described with reference to FIG. 1.

Figure 1:
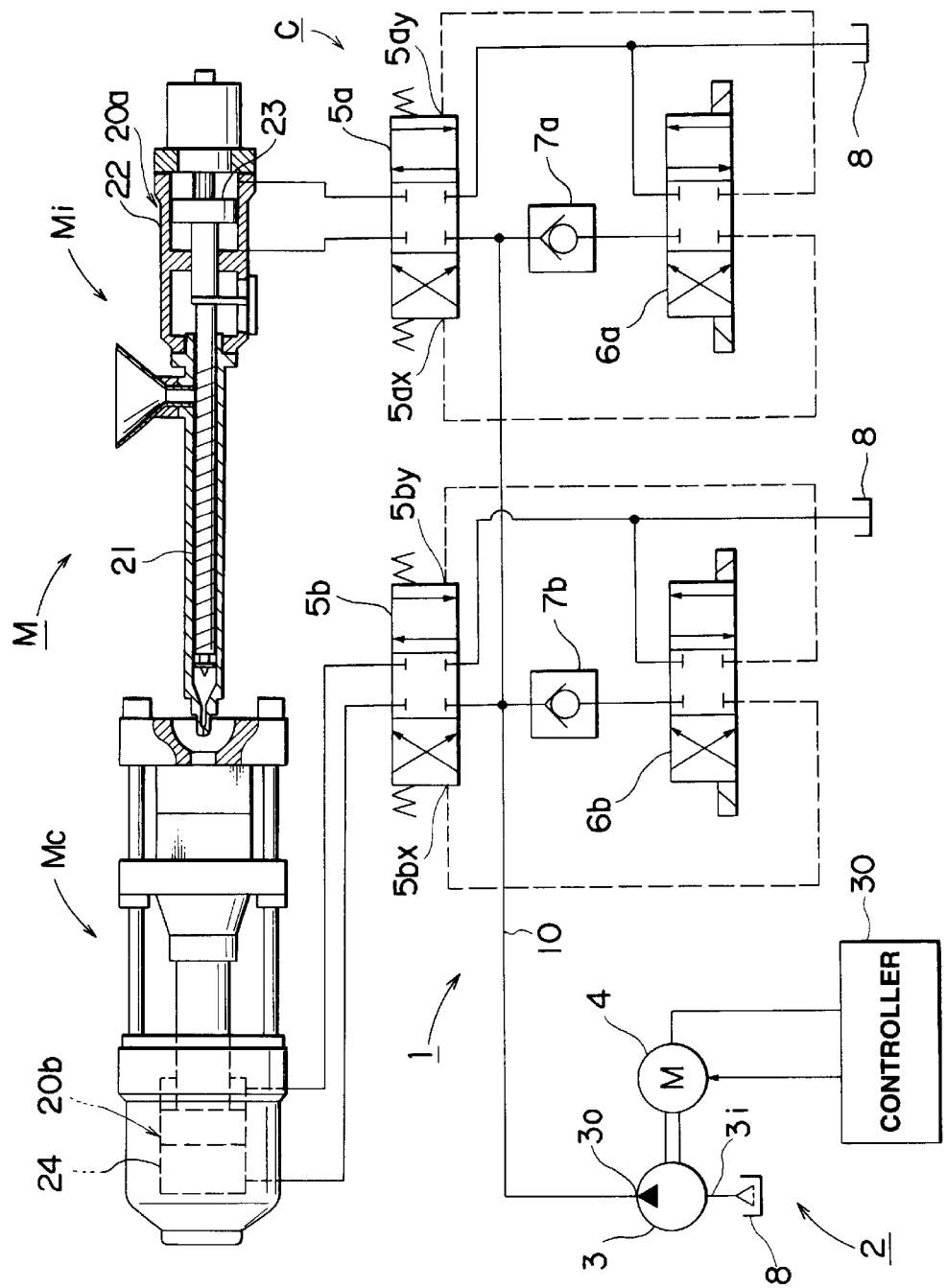
FIG. 1 is a diagram showing the structure of an injection molding machine, including a hydraulic circuit of a hydraulic drive system according to an embodiment of the present invention.
Figure 2:
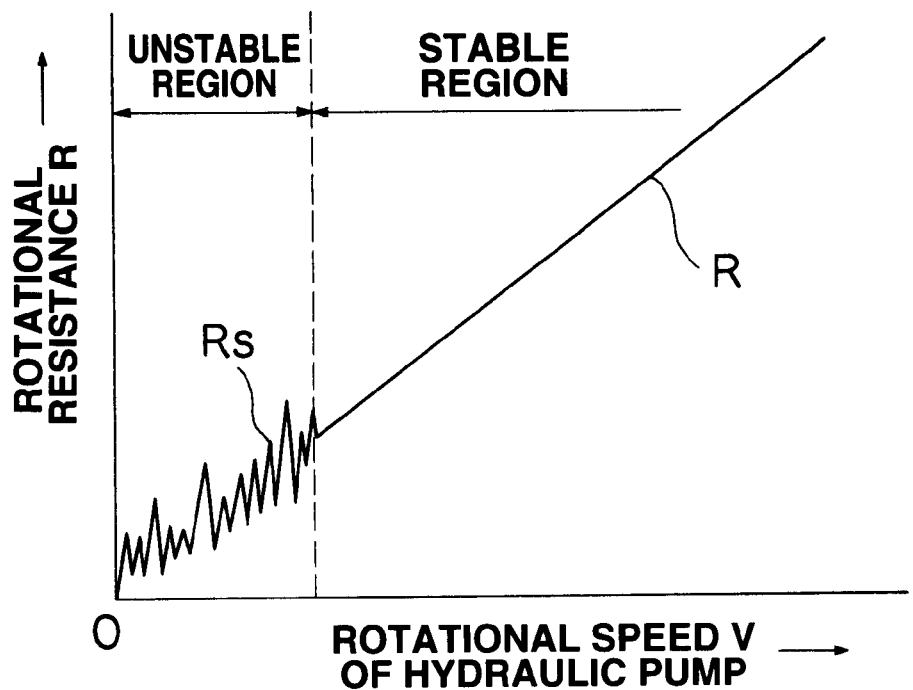
FIG. 2 is a characteristic diagram showing the relationship between the rotational speed of a hydraulic pump and the rotational resistance of the hydraulic pump in a conventional hydraulic drive system.

In FIG. 1, symbol M denotes an injection molding machine, which includes an injection unit Mi and a mold clamping unit Mc. Symbol C denotes a hydraulic circuit, which includes the hydraulic drive system 1 of the present embodiment. The illustrated hydraulic circuit C includes only those circuit components related to the present invention (embodiment), while other circuit components are omitted. The hydraulic drive system 1 includes a hydraulic power source 2, which in turn includes a fixed-displacement hydraulic pump 3 and a servomotor 4 for driving the hydraulic pump 3. Reference numeral 30 denotes a controller, which controls the rotational speed V of the servomotor 4 to thereby control the discharge rate and discharge pressure of the hydraulic pump 3.

A discharge port 30 of the hydraulic pump 3 is connected to a supply line 10 of working fluid. The supply line 10 is connected to 4-port control valves 5a and 5b. The control valves 5a and 5b are connected to an oil tank 8. The control valve 5a is connected to an injection cylinder (hydraulic actuator 20a) of the injection unit Mi, whereas the control valve 5b is connected to a mold clamping cylinder 24 (hydraulic actuator 20b) of the mold clamping unit Mc. A suction port 3i of the hydraulic pump 3 is connected to the oil tank 8.

Pilot ports 5ax and 5ay of the control valve 5a are connected to the supply line 10 of working fluid discharged from the hydraulic pump 3 via a changeover valve (solenoid controlled changeover valve) 6a and a check valve 7a. The changeover valve 6a is controlled by the controller 30. The check valve 7a is connected in series to the changeover valve 6a and is adapted to prevent backflow from the pilot ports 5ax and 5ay. Pilot ports 5bx and 5by of the control valve 5a are connected to the supply line 10 via a changeover valve (solenoid controlled changeover valve) 6b and a check valve 7b. The changeover valve 6b is controlled by the controller 30. The check valve 7b is connected in series to the changeover valve 6b and is adapted to prevent backflow from the pilot ports 5bx and 5by. The changeover valves 6a and 6b are connected to the oil tank 8.

Next, the operation of the hydraulic drive system 1 will be described with reference to FIG. 1.

The description will start from an injection step, in which the injection unit Mi injects molten resin into a mold. Upon start of the injection step, the controller 30 sends a changeover signal to the changeover valve 6a so as to select flow paths within the changeover valve 6a as represented by the right-hand symbol of the changeover valve 6a in FIG. 1. Thus, working fluid is supplied from the supply line 10 to the pilot port 5ax via the check valve 7a and the changeover valve 6a, thereby selecting flow paths within the control valve 5a as represented by the left-hand symbol of the control valve 5a in FIG. 1. As a result, working fluid is supplied from the supply line 10 to the rear oil chamber of the injection cylinder 22, thereby advancing a piston 23. That is, a screw 21 advances to thereby inject molten resin into the mold. In the early stage of the injection step, the pressure of injection relatively increases as the screw 21 starts advancing. Thus, a sufficiently high pilot pressure is applied to the pilot port 5ax, so that the control valve 5a is controlled reliably and stably.

Here, it is assumed that the pressure of injection drops as the screw 21 advances further or in relation to a control pattern with a resultant drop in the discharge pressure of the hydraulic pump 3. In this case, even when the pressure of working fluid in the supply line 10 drops below a required pilot pressure, the pilot pressure applied to the pilot port 5ax is maintained unchanged. That is, since the check valve 7 for preventing backflow from the pilot port 5ax is connected to the pilot port 5ax, the pilot pressure applied to the pilot port 5ax is held at a level which has been established before the discharge pressure of the hydraulic pump 3 drops.

Thus, even during low-pressure control in which an unstable control region may be generated, problems such as the problem of the control valve 5a returning to its neutral position are avoided, so that the control system does not enter an unstable or uncontrollable state. Accordingly, low-pressure control and low-speed control, which have conventionally been considered to be difficult to perform, become possible to perform. The above embodiment is described while mentioning an injection step. However, similar control operations (functions) can be realized in other steps in relative to the injection operation. Also, similar control operations (functions) can be realized with respect to the mold clamping cylinder 24. Since the features of the present invention can be realized simply through connection of the check valves 7a and 7b, the configuration of the hydraulic circuit C can be simplified, thereby reducing cost and size. Since release of working fluid is not involved, energy efficiency and control performance can be enhanced.

While the present invention has been described with reference to the preferred embodiment, the present invention is not limited thereto. Regarding structural details, shape, among others, modifications and any omission or addition may be possible as needed without departing from the scope of the invention. For example, in the case of a step in which low-pressure control is performed from the beginning, a state for rendering the discharge pressure of the hydraulic pump 3 high is established in advance; and then, regular low-pressure control is performed.

What is claimed is:

1. A hydraulic drive system of an injection molding machine which has a hydraulic power source equipped with a fixed-displacement hydraulic pump and a servomotor for driving the hydraulic pump and functioning to control discharge rate and discharge pressure of the hydraulic pump through control of rotational speed of the servomotor, wherein a pilot port of a control valve connected to a hydraulic actuator of the injection molding machine is connected to a supply line of working fluid discharged from the hydraulic power source, via a series circuit including a check valve for preventing backflow from the pilot port and a changeover valve.

2. A hydraulic drive system of an injection molding machine according to claim 1, wherein said hydraulic actuator is an injection cylinder.

3. A hydraulic drive system of an injection molding machine according to claim 1, wherein said hydraulic actuator is a mold clamping cylinder.

4. A hydraulic drive system of an injection molding machine according to claim 1, wherein said hydraulic actuator is an injection cylinder and a mold clamping cylinder.

5. A hydraulic drive system of an injection molding machine according to claim 1, wherein when said hydraulic actuator is to be started, said changeover valve is changed over so as to supply working fluid from the supply line to the pilot port.

* * * * *